US007846561B2

(12) United States Patent
Kulkarni

(10) Patent No.: US 7,846,561 B2
(45) Date of Patent: Dec. 7, 2010

(54) ENGINE PORTIONS WITH FUNCTIONAL CERAMIC COATINGS AND METHODS OF MAKING SAME

(75) Inventor: Anand A. Kulkarni, Oviedo, FL (US)

(73) Assignee: Siemens Energy, Inc., Orlando, FL (US)

( * ) Notice: Subject to any disclaimer, the term of this patent is extended or adjusted under 35 U.S.C. 154(b) by 146 days.

(21) Appl. No.: 12/019,931

(22) Filed: Jan. 25, 2008

(65) Prior Publication Data

US 2009/0074961 A1 Mar. 19, 2009

Related U.S. Application Data

(60) Provisional application No. 60/973,563, filed on Sep. 19, 2007, provisional application No. 60/973,554, filed on Sep. 19, 2007.

(51) Int. Cl.
*B32B 9/00* (2006.01)

(52) U.S. Cl. ....................... 428/702; 428/323; 428/688; 428/689; 428/697; 428/699; 428/701; 428/820

(58) Field of Classification Search ................. 428/702, 428/323, 688, 689, 697, 699, 701, 920
See application file for complete search history.

(56) References Cited

U.S. PATENT DOCUMENTS

| | | | |
|---|---|---|---|
| 3,758,233 A | 9/1973 | Cross et al. | |
| 5,780,171 A * | 7/1998 | Nissley et al. | 428/629 |
| 6,447,848 B1 | 9/2002 | Chow et al. | |
| 6,620,525 B1 * | 9/2003 | Rigney et al. | 428/633 |
| 6,716,539 B2 | 4/2004 | Subramanian | |
| 2007/0082131 A1 | 4/2007 | Doesburg et al. | |
| 2009/0075057 A1 | 3/2009 | Kulkarni | |

FOREIGN PATENT DOCUMENTS

| | | |
|---|---|---|
| EP | 1580293 A2 | 9/2005 |
| EP | 1772441 A1 | 4/2007 |
| EP | 1801256 | 6/2007 |

OTHER PUBLICATIONS

K.R.Cross, W.R. Lull, R.L. Newman and J.R. Cavanagh, "Potential of Graded Coatings in Vibration Damping"; Engineering Notes; Nov. 1973; pp. 689-691; vol. 10, No. 11; Detroit Diesel Allison Division, General Motors Corporation, Indianapolis, Indiana, USA.

(Continued)

*Primary Examiner*—Gwendolyn Blackwell

(57) ABSTRACT

A ceramic coating for imparting one or more of a variety of functional characteristics (e.g., reducing vibration levels) to one or more components or portions of an engine (e.g., ring segments, transition ducts, combustors, blades, vanes and shrouds of a turbine engine, portions thereof, and portions of a diesel engine), the components or portions comprising such a coating, and methods of making same. The ceramic coating exhibits a gradient or other change in the functional characteristic(s) through the thickness of the coating, across the surface area of the coating or both.

14 Claims, 4 Drawing Sheets

OTHER PUBLICATIONS

A. Kulkarni, J. Gutleber, S. Sampath, A. Goland, W.B. Lindquist, H. Herman, J.J. Allen, B. Dowd; "Studies of the Microstructure and Properties of Dense Ceramic Coatings produced by High-Velocity Oxygen-Fuel Combustion Spraying"; Materials Science & Engineering; Oct. 2003; pp. 124-137; Elsevier B.V., USA.

A. Kulkarni, Z. Wang, T. Nakamura, S. Sampath, A. Goland, H. Herman, J. Allen, J. Ilavsky, G. Long, J. Frahm, R.W. Steinbrech; "Comprehensive microstructural characterization and predictive property modeling of plasma-sprayed zirconia coatings"; Mar. 2003; pp. 2457-2475; Acta Materialia Inc.; Elsevier Science Ltd., USA.

Anand Kulkarni, A. Vaidya, A. Goland, S. Sampath, H. Herman; "Processing effects on porosity-property correlations in plasma sprayed yttria-stabilized zirconia coatings"; Materials and Engineering A359; Apr. 2003; 11 Pages; USA.

Anand A. Kulkarni, "On the Porosity-Property Correlations in Thermo-Structural Coatings"; Towards an Integrated Approach; State University of New York at Stony Brook; Dec. 2002; 200 Pages; USA.

Zhihai Han, Bingshi Xu, Haijun Wang, Shikui Zhou; "A comparison of thermal shock behavior between currently plasma spray and supersonic plasma spray CeO2-Y2O3-ZrO2 graded thermal barrier coatings"; Surface & Coatings Technology; 2007; pp. 5253-5256.

* cited by examiner

ENGINE PORTIONS WITH FUNCTIONAL CERAMIC COATINGS AND METHODS OF MAKING SAME

CROSS REFERENCE TO RELATED APPLICATIONS

This application claims priority from U.S. Provisional Application Ser. Nos. 60/973,563 and 60/973,554, each of which were filed on Sep. 19, 2007, the disclosures of which are incorporated by reference in their entirety herein.

FIELD OF THE INVENTION

The present invention relates to the use of ceramic coatings to impart at least one functional characteristic (e.g., reduced vibration levels) to one or more components or other portions of an engine (e.g., ring segments, transition ducts, combustors, blades, vanes and shrouds of a turbine engine or portions thereof in particular, to such coatings having a change in a functional characteristic (e.g., vibration damping ability) through the thickness and/or across the surface area of the coating and, more particularly, to such coatings where the change in functional characteristic is the result of a corresponding change in the number and/or type of interfaces between deposited ceramic particles forming the coating. The present invention also relates to such coated engine components or portions, as well as to methods of making same.

BACKGROUND OF THE INVENTION

Ceramic coatings have been used to protect (e.g., thermal, oxidation and hot corrosion protection) high temperature components in gas turbines and diesel engines. Such ceramic coatings have been used to delay the thermally-induced failure mechanisms that can impact the durability and life of such high temperature engine components. Plasma spraying (e.g., DC-arc) techniques have been used to deposit such thermal barrier coatings (i.e., TBCs). This process involves melting a feedstock material in a plasma plume and rapidly transporting the resulting molten particles so as to "splat" against a substrate surface. The molten particles typically solidify rapidly upon contacting the substrate surface. Successive build-up of these "splat" particles has resulted in a layered arrangement of the particles in the deposited coating, where the splats are entwined in complex arrays that generally have a brick-wall-like structure. These splats are separated by inter-lamellar pores resulting from rapid solidification of the lamellae, globular pores formed by incomplete inter-splat contact or around un-melted particles, and intra-splat cracks due to thermal stresses and tensile quenching stress relaxation. These pores and cracks interfere with the direct flow of heat (thermal barrier) resulting in lowered thermal conductivity. The cracks also increase the overall compliance of the coating and enhance the thermal shock resistance.

The present invention is an improvement in such ceramic coatings and the uses thereof.

SUMMARY OF THE INVENTION

Ceramic coatings according to the present invention are able to impart at least one functional characteristic to components or portions of an engine (e.g., a turbine or diesel engine) that are exposed to high temperatures. Such functional characteristics can include one or more or a combination of the following: (a) thermo-physical properties (e.g., thermal conductivity), (b) mechanical properties (e.g., hardness, elastic modulus, etc.), (c) abradability (e.g., a porous abradable structure at the top surface and dense structure providing adhesion near the substrate-coating interface), (d) vibration damping, (e) crack arresting, and (f) stress relaxation. The present ceramic coatings can be employed to protect, for example, high temperature components (e.g., turbine blades, turbine vanes or other parts of a turbine engine) from vibration induced fatigue or other damage and thereby increase the life expectancy of such components. The present ceramic coatings exhibit a gradient or other change in the functional characteristic(s) imparted (e.g., its ability to dampen vibration) through a portion or all of the thickness of the coating, across a portion or all of the surface area of the coating, or both. Such changes in the functional characteristic(s) (e.g., vibration damping ability) imparted to the coating can be obtained by forming the coating with a corresponding gradient or other change in the particle interfaces between the deposited ceramic particles forming the coating.

In one aspect of the present invention, a component or portion of an engine (e.g., a turbine engine, diesel engine, etc.) is provided that comprises a surface partially or completely coated with a ceramic coating having a thickness and a surface area. The coating comprises a plurality of ceramic particles and corresponding particle interfaces, with at least some, most or all of the ceramic particles being partially, or a combination of fully and partially, fused together, mechanically bonded together or both. The coating has a change in the particle interfaces through a portion or all of the thickness of the coating, across a portion or all of the surface area of the coating or both. The coating exhibits a corresponding change in the ability of the coating to impart at least one functional characteristic to the engine portion (e.g., vibration damping) through a portion or all of the thickness of the coating, across a portion or all of the surface area of the coating or both. This corresponding change in one or more functional characteristics (e.g., vibration damping ability) is caused at least in part by, and may be entirely due to, such change(s) in the particle interfaces.

For example, in order to obtain improved vibration damping ability in the ceramic coating, according to the present invention, it can be desirable for the coating to be a multilayered coating for multifunctionality, with a layer closer to the engine surface having relatively more porosity and particle interfaces (e.g., having a lower elastic modulus) and another layer located further from the engine surface having relatively less porosity and fewer particle interfaces (e.g., a higher elastic modulus). Such a multilayered coating can exhibit multiple functional characteristics (i.e., multi-functionality). For example, a multilayered thermal barrier ceramic coating, according to the present invention, can include a layer that contacts the engine surface that is made to have a relatively high porosity and more particle interfaces to accommodate residual stresses resulting from mismatches in thermal coefficients of expansion between the ceramic coating and the engine surface.

Typically a thermal barrier coating system includes two coatings (i.e., a top coating and a bottom coating) bonded onto the engine surface such as, for example, one made of a Nickel based superalloy. The top coating is a thermal barrier coating and the bottom coating is a bond coat that is used to help compensate for differences in coefficients of thermal expansion between the thermal barrier coating material and the substrate material. The bond coat is deposited before the thermal barrier coating. When the engine surface is a nickel base superalloy, it can be desirable for the bond coat to be a nickel base alloy. In addition to helping the bond between the thermal barrier coating and the substrate, the bond coat can also provide an increased oxidation and corrosion resistance. Even so, nickel based alloys can oxidize when exposed to hot temperatures in the gas turbine and can form a thermally grown oxide (e.g., alumina or chromia). There is a mismatch between the thermally formed oxide and the thermal barrier coating that can cause the bond between the thermal barrier coating and the engine surface to fail. A higher porosity in the portion (e.g., layer) of the thermal barrier coating in contact with the bond coat can be beneficial to accommodate the stresses developed due to this mismatch. Thus, even when a conventional bond coat is used, a thermal barrier ceramic coating according to the present invention can still be useful, to accommodate such stresses.

In addition, the present ceramic coating can be made to have a layer on its surface with relatively low porosity and fewer particle interfaces. Such a ceramic coating can exhibit improved erosion resistance on its surface. Thus, the present inventive coating can exhibit a corresponding change in functionality (e.g., the ability of the coating to dampen vibration, conduct heat, etc.) through a portion or all of the thickness of the coating, across a portion or all of the surface area of the coating or both.

In another aspect of the present invention, a method of imparting at least one functional characteristic to a component or portion of an engine (e.g., a turbine engine, diesel engine, etc.) is provided. The method comprises providing at least the component or portion of an engine (e.g., a turbine engine, diesel engine, etc.) and spraying ceramic particles so as to form a ceramic coating, and preferably a multilayered ceramic coating, onto at least part or all of a surface of the engine component or portion. The surface of the engine component or portion can have a previously applied bond coat thereon, before the spraying of the ceramic particle coating. The resulting ceramic coating has a thickness, a surface area and comprises (a) a plurality of the ceramic particles that are partially, or a combination of fully and partially, fused together, mechanically bonded together or both, and (b) corresponding particle interfaces. The spraying process is performed such that the ceramic coating has a change in the particle interfaces through a portion or all of the thickness of the ceramic coating, across a portion or all of the surface area of the ceramic coating or both. As a result, the ceramic coating exhibits a corresponding change in the ability of the ceramic coating to impart at least one functional characteristic (e.g., vibration damping) to the engine portion through a portion or all of the thickness of the ceramic coating, across the surface area of the ceramic coating or both. This corresponding change in one or more functional characteristics (e.g., vibration damping ability) is caused at least in part by, and may be entirely due to, such change(s) in the particle interfaces.

For example, the ceramic coating can be a multilayered coating, with a layer closer to the engine surface being formed by one spraying process and having relatively more porosity and particle interfaces, and with another layer located further from the engine surface being formed by a different spraying process and having relatively less porosity and fewer particle interfaces. The ceramic coating can exhibit a corresponding change in the ability of the ceramic coating to dampen vibration through a portion or all of the thickness of the coating, across a portion or all of the surface area of the coating or both.

The present method can be practiced using a plurality of ceramic particle feedstocks, with each feedstock serving as a source of ceramic particle material for the spraying process. The spraying process can comprise a plurality of separate steps of spraying ceramic particles, with each step of spraying using a different one of the plurality of ceramic particle feedstocks as a source of ceramic particle material. In addition or alternatively, the spraying process of the present method can comprise a plurality of separate steps of spraying ceramic particles, with each step of spraying using a different one of a plurality of ceramic particle deposition techniques.

The present method can be practiced using a plurality of ceramic particle feedstocks, with each feedstock serving as a source of ceramic particle material for said spraying, and using a plurality of separate steps of spraying ceramic particles. Each step of spraying can use (a) a different one of the plurality of ceramic particle feedstocks as a source of ceramic particle material, (b) a different one of a plurality of ceramic particle deposition techniques, or (c) a combination of (a) and (b). The present method can also comprise a continuous process of spraying particles from two or more different particle feedstocks, where the feedstock particulate being deposited is varied in-situ, during the continuous spraying process. The different feedstock particulate may be deposited individually in series or mixed together under various desirable ratios. Such a continuous spraying process is described in the commonly assigned, concurrently filed U.S. Provisional Application Ser. Nos. 60/973,563 and 60/973,554 and commonly assigned Patent Application, U.S. Ser. No 12/019,948entitled IMPARTING FUNCTIONAL CHARACTERISTICS TO ENGINE PORTIONS, filed concurrently herewith, the entire disclosure of each of these applications is incorporated by reference herein.

DETAILED DESCRIPTION

Figure 1:
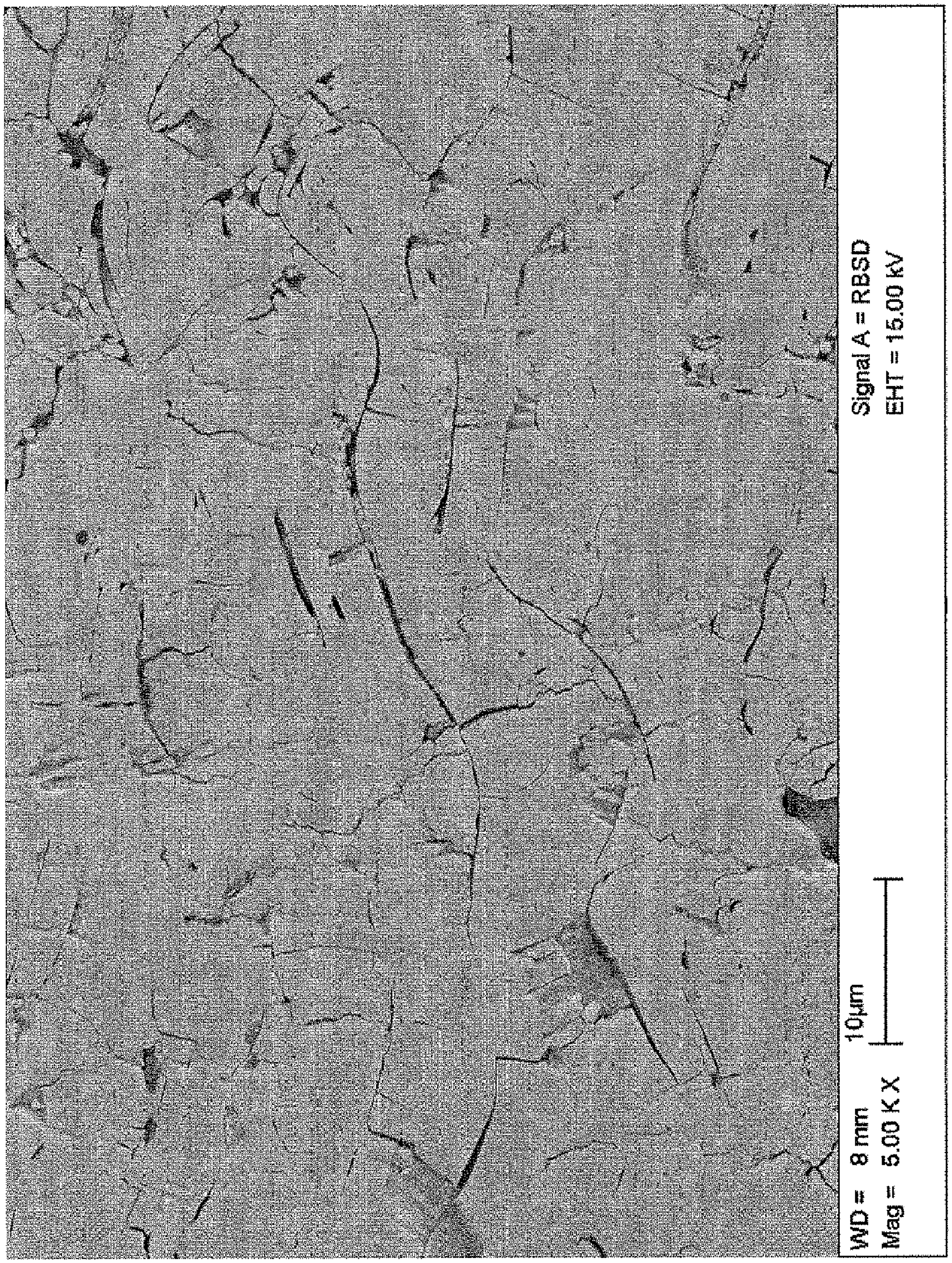
FIG. 1 is an SEM photomicrograph of the cross-section of a ceramic coating made using a solid particle feedstock of fused and crushed yttria stabilized zirconia powder.

Ceramic coatings according to the present invention are able to impart one or more of a variety of functional characteristics to components or portions of an engine (e.g., ring segments, transition ducts, combustors, blades, vanes and shrouds of a turbine engine, portions thereof, and portions of a diesel engine) that are exposed to high temperatures. By way of example, the following description focuses on such ceramic coatings that exhibit the functional characteristic of vibration damping. However, it is believed that the general teachings of the present disclosure can be used to produce ceramic coatings that impart other functional characteristics to the engine component or portion.

Vibration levels of one or more components of an engine (e.g., blades and vanes of a turbine engine), and thereby within the engine, can be reduced by coating a portion or all of the one or more engine components with different or even the same ceramic material, according to the principles of the present invention. The vibration damping ability of the present coating changes (e.g., can be in the form of a gradient) through a portion or all of the thickness of the coating, across a portion or all of the surface area of the coating, or both. This change in vibration damping can be produced by forming a microstructure in the coating that exhibits a corresponding change in the particle interface (e.g., porosity) between the particles forming the coating. This change in the particle interface can be indirectly indicated by measuring differences in elastic modulus through a portion or all of the thickness of the coating, across a portion or all of the surface area of the coating or both.

Components or portions of an engine (e.g., blades and vanes of a turbine engine and portions thereof) can be practiced according to the present invention by having a surface partially or completely coated with a multilayered ceramic coating. The multilayered ceramic coating typically defines a top layer of a thermal barrier coating system. A bottom layer may comprise a bond coat applied to a substrate, such as, for example, a Nickel based superalloy, which defines the surface of the component or engine portion surface. Hence, a surface partially or completely coated with a multilayered ceramic coating may have a bond coat between the coating and the substrate. The multilayered ceramic coating includes a plurality of ceramic particles, with neighboring particles defining particle interfaces. At least some, most or all of the ceramic particles are partially, or a combination of fully and partially, fused together, mechanically bonded together or both. The composition of the ceramic particles can be different or even the same. While it can be desirable for different (e.g., shaped, etc.) ceramic particles to be used, it can also be desirable for the ceramic particles to be made from the same ceramic material. The coating has a change in the particle interfaces (e.g., the number of particle interfaces, the type of particle interfaces or both can change according to an increasing gradient, a decreasing gradient, randomly or according to a pattern) through a portion or all of the thickness of the coating, across a portion or all of the surface area of the coating or both. The coating exhibits a corresponding change (e.g., the coating exhibits an increasing gradient, a decreasing gradient, random changes or a patterned change) in the ability of the coating to dampen vibration through a portion or all of the thickness of the coating, across a portion or all of the surface area of the coating or both. This corresponding change in vibration damping ability is caused at least in part by, and may be entirely due to, such change(s) in the particle interfaces.

Figure 2:
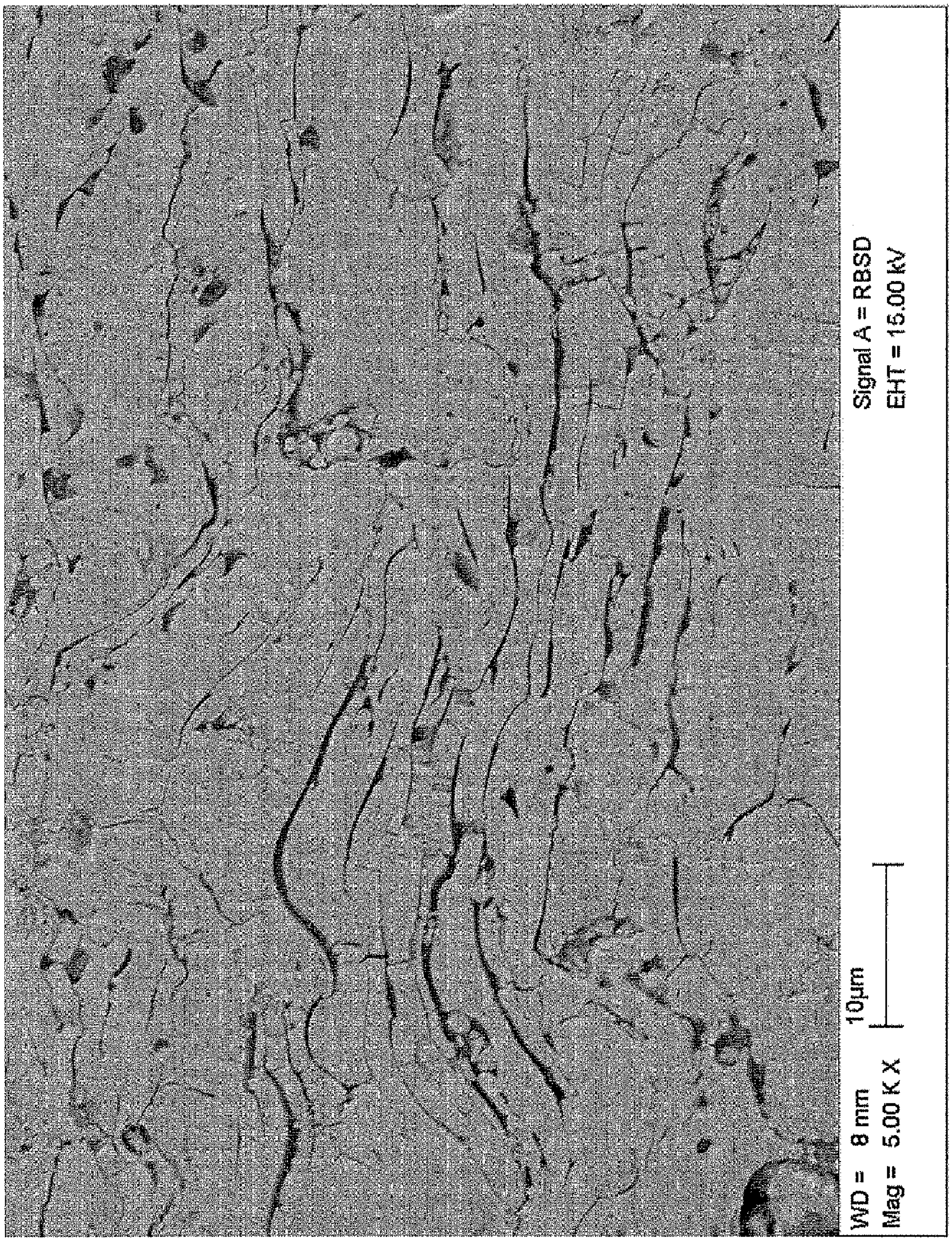
FIG. 2 is an SEM photomicrograph of the cross-section of a ceramic coating made using the same process and feedstock ceramic powder composition as that used for the coating of FIG. 1, except that a feedstock of hollow yttria stabilized zirconia powder was used.

Referring to FIGS. 1 and 2, two coatings having distinct microstructures were made using conventional DC-arc plasma spraying technology and two different feedstock morphologies. The ceramic material used in each coating was 7-8 mol % yttria stabilized zirconia (8YSZ) powder. In particular, the feedstock used to make the coating of FIG. 1 was a solid particle feedstock made using a conventional fused and crushed process. The resulting coating shows a relatively dense microstructure with less inter-particle interfaces. Such a coating could be the result, in part or entirely because, of the solid feedstock particles only being softened or partially melted (i.e., not completely melted) by the plasma spraying process before impacting its target substrate.

The other feedstock used to make the coating of FIG. 2 was a hollow particle feedstock. The hollow particles used to make this feedstock can be manufactured by using additives with a conventional powder feedstock (e.g., made using conventional powders prepared from a conventional fused and crushed process and/or from a conventional Sol-gel process). This powder feedstock and additive mixture is then fed through a plasma spray torch, in a conventional plasma densification process, to obtain hollow powders. These hollow powders are then used to make the hollow particle feedstock. The coating here shows a large number of inter-particle interfaces resulting mainly because the hollow feedstock particles (i) are more easily collapsed upon impact on the target substrate, which results in relatively thin splat layers, (ii) have melted more completely, because they are not solid (i.e., have less mass to be heated to melting), or (iii) a combination of both. Another type of feedstock made of both solid and hollow particles (not shown) can also be used to produce a coating layer having a hybrid microstructure, where the coating results from fused and crushed powder and plasma densified powder.

After being deposited (i.e., impacting) onto the target substrate to be coated, the thickness of the deposited hollow particles is less than (e.g., about half) the thickness of the deposited solid particles. The impacted hollow particles result in splat interfaces that lead to an increase in interfaces and a reduction in the thermal conductivity and elastic modulus of the resulting sprayed ceramic coating. For example, the elastic modulus of the coating shown in FIG. 1 is 57 GPa, and the elastic modulus of the coating shown in FIG. 2 is 29 GPa.

As used herein, a “multilayered ceramic coating” is a coating that is formed using a discontinuous process, where the process is separately started and stopped for each layer being formed. For example, the coating material feedstock, the particle deposition technique (e.g., DC-arc plasma spray, high velocity oxygen-fuel (HVOF) thermal spraying, low pressure plasma spraying, solution plasma spraying and wire-arc spraying) or both can be changed after a desired layer is deposited (i.e., after the coating process is stopped) and before a new layer is deposited (i.e., before the coating process is restarted). With a multilayered ceramic coating, one or more or all of the individual layers can be discernable from one another. It is likely that one or more of the layers are discernable from one another, but the coating does not necessarily have to include one or more discernable layers.

As used herein, the term “particle” refers to a solid, porous or hollow particle that is any size, shape and/or otherwise configured so as to be suitable for forming the desired coating, including but limited to flattened (i.e., splat particles) or otherwise deformed particles.

As used herein, two particles are considered fused together when a surface of one particle is at least partially melt bonded or otherwise diffusion bonded to a surface of the other particle in whole or, typically, in part.

As used herein, a “splat particle” is a particle that has impacted a surface and flattened so as to be thinner than it is wide. For example only, a splat particle can be plate-like or flake-like. A splat particle can also have a uniform or non-uniform thickness.

As used herein, a “particle interface” refers to the boundary or interface between contacting, opposing or otherwise adjacent surfaces of neighbor particles. For example only, a particle interface can be any space or gap between neighboring particles, any area of contact between neighboring particles, and any region of fusion between neighboring particles. Neighboring particles are particles that do not have another particle therebetween.

As used herein, a “splat interface” is a type of particle interface between neighboring splat particles such as the interfaces, e.g., made from neighboring hollow particles.

As used herein, a “particle pore interface” is a type of particle interface that is in the form of a space or gap between neighboring particles. Such particle pore interfaces can be in the form of globular pores, inter-lamellar pores and any other form of porosity. Particle pore interfaces can also be in the form of a crack. A particle pore interface can include an area between neighboring particles where the neighboring particles make partial or complete contact but are not fused together in the area(s) of contact. Particle pore interfaces defined by neighboring particles that contact each other, but are not fused together, can form mechanical bonds within the coating.

Such fused or mechanically bonded particle interfaces can function to dissipate vibration energy transmitted through the engine component or portion by absorbing the vibration energy. Such particle interfaces can absorb vibration energy, when the energy is intense enough to deform or break such bonds between the neighboring particles. For example, with a mechanically bonded particle pore interface, the frictional forces between the neighboring particles will need to be overcome, at least in part, in order to absorb vibration energy. By using the vibration energy to overcome or at least stretch the neighboring particle bonds, the transmission of vibration through the coated engine component or portion can be likewise halted or diminished.

As the number of particle interfaces in a given volume of coating increases, the ability of that volume of coating to dampen vibration can also increase, especially as the number of particle pore interfaces increases. The number of particle interfaces for a given volume of coating can increase as the number of particles increases (e.g., as the size of the particles decreases), as the thickness of the deposited particles decreases or both. In addition, as the number and/or size of particle pore interfaces or other porosity increases for a given volume of coating, the ability of that volume of coating to dampen vibration can also increase. The elastic modulus of a given volume of coating can be inversely affected by the number and/or size of particle pore interfaces, or other porosity, as well as by the number of other particle interfaces in the given volume of coating. For example, the elastic modulus of a given volume of coating material typically decreases as the number of particle interfaces, especially particle pore interfaces, in the volume of coating increases. Therefore, since the number, type and/or size of particle interfaces can indicate the ability of the coating to dampen vibration, measured values of the elastic modulus of a given volume (e.g., one or more coating layers, one or more coating surface areas) of coating material can be used to characterize the vibration damping ability of the entire coating material. For example, as the elastic modulus of a given volume of coating material changes one way, the vibration damping ability of that volume of coating material may change the opposite way.

Thus, vibration dampening can be controlled according to the present invention, for example, by using two or more different particle feedstocks to (1) control the dampening mechanism in the coating through the particle interface microstructure in the coating (e.g., mechanical verses fusion bonding between neighboring particles), and/or (2) have particle interfaces that are graded or exhibit otherwise changing microstructures through a portion or all of the thickness of the coating, over a surface area of the coating, or both. Such a coating could include a layer of the coating shown in FIG. 1 and another layer of the coating shown in FIG. 2, where each of the coating layers is deposited separately (i.e., discontinuously). For example, in order to obtain improved vibration damping ability in the coating, according to the present invention, it may be desirable for the coating to be a multilayered coating having multifunctionality, with the layer closest to the target substrate (e.g., the engine component or portion) having a lower elastic modulus and more compliance to provide improved vibration damping as well as to accommodate for residual stresses (e.g., between the ceramic coating and the target substrate or the ceramic coating and a bond coat on the target substrate) due to thermal expansion mismatch and the growth of thermally grown oxides, and the layer forming the surface of the coating having a higher elastic modulus for erosion resistance at the surface. The combination of the two layers can also result in a desirable effective thermal conductivity. Overall, a higher vibration damping ability can be obtained with internal friction across the interfaces (i.e., with a coating having a low elastic modulus).

In addition or alternatively to controlling the damping mechanism through the use of two or more feedstocks manufactured from various techniques (e.g., Hollow particles versus solid particles), it is also contemplated that the damping mechanism in the coating can be controlled by separately (i.e., discontinuously) utilizating two or more spray technologies to deposit the desired particle feedstock. Such coatings can be deposited, for example, by using plasma spraying (e.g., DC-arc, low pressure plasma spraying), HVOF thermal spraying, solution plasma spraying and wire-arc spraying.

Thus, such components or portions of an engine (e.g., blades and vanes of a turbine engine and portions thereof) can be produced by providing at least the component or portion of the engine and depositing ceramic particles so as to form a ceramic coating onto at least part or all of a surface of the engine component or portion, for example, by using plasma spraying (e.g., DC-arc, etc.), high velocity oxygen-fuel (HVOF) thermal spraying or both. The composition of the ceramic particles can be different or even the same, and it is preferable to form the particles into a multilayered ceramic coating. The resulting ceramic coating has a thickness, a surface area and comprises (a) a plurality (i.e., at least some, most or all) of the ceramic particles that are partially, or a combination of fully and partially, fused together, mechanically bonded together or both, and (b) corresponding particle interfaces between the neighboring particles. The spraying process is performed such that the ceramic coating has a change in the particle interfaces (e.g., the number of particle interfaces, the type of particle interfaces or both can increase, decrease, randomly change or change according to a pattern) through a portion or all of the thickness of the ceramic coating, across a portion or all of the surface area of the ceramic coating or both. As a result, the ceramic coating exhibits a corresponding change (e.g., the coating exhibits an increasing gradient, a decreasing gradient, random changes or a patterned change) in the ability of the ceramic coating to dampen vibration through a portion or all of the thickness of the ceramic coating, across a portion or all of the surface area of the ceramic coating or both. This corresponding change in vibration damping ability is caused at least in part by, and may be entirely due to, such change(s) in the particle interfaces.

Figure 3:
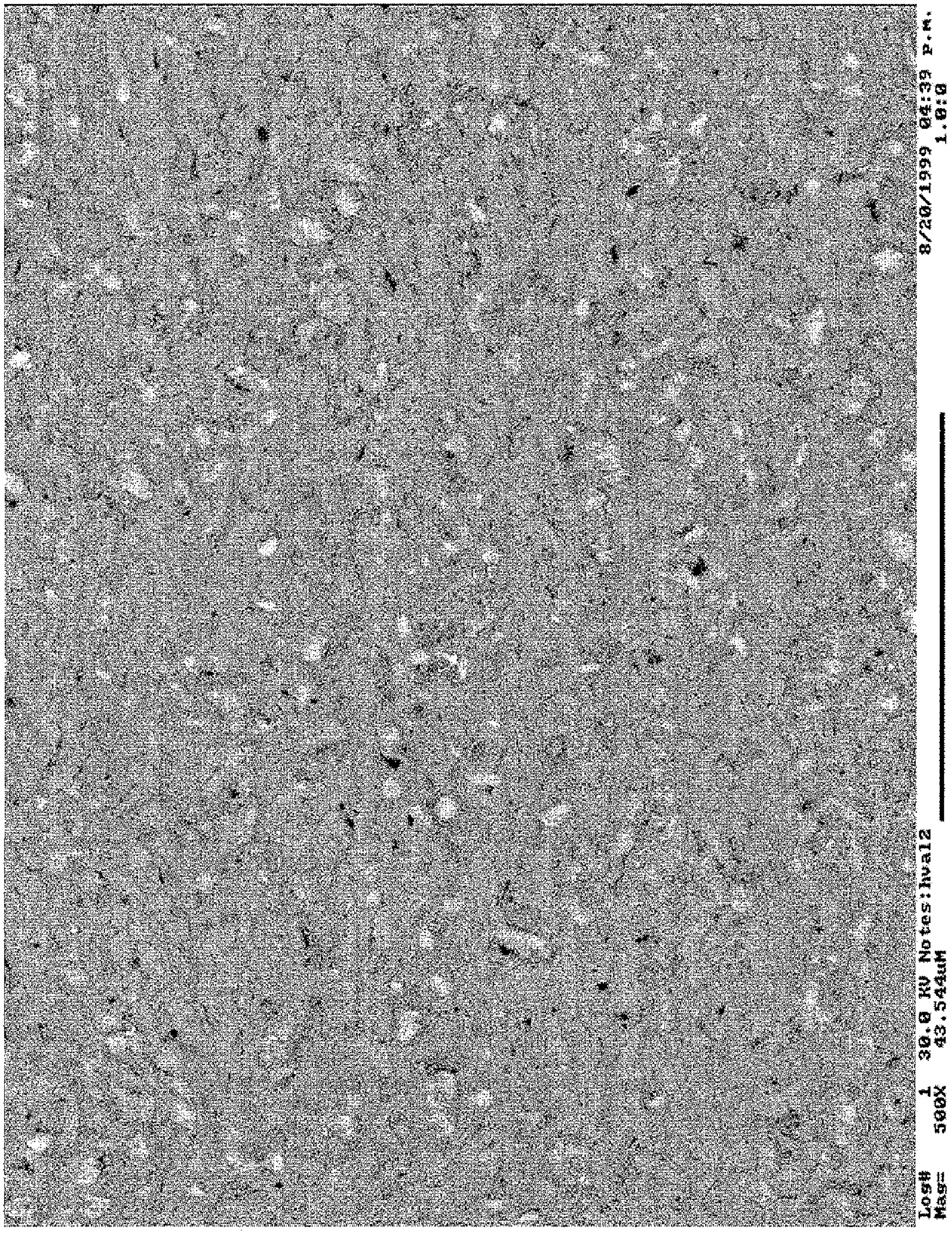
FIG. 3 is an SEM photomicrograph of the cross-section of a ceramic coating made using a DC-arc plasma spray coating process and a solid particle feedstock of fused and crushed alumina powder.
Figure 4:
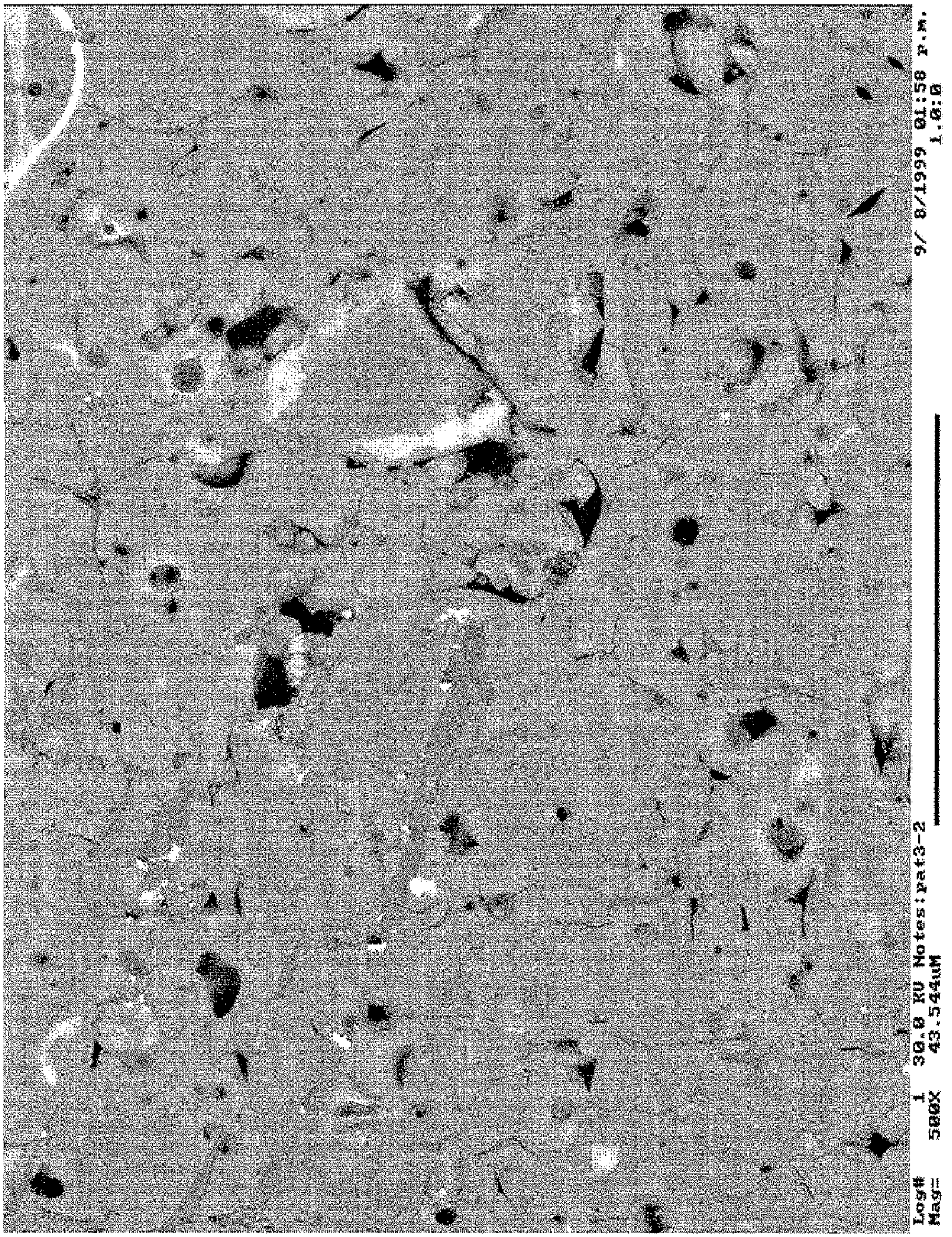
FIG. 4 is an SEM photomicrograph of the cross-section of a ceramic coating made using the same solid particle feedstock of FIG. 3 but with an HOVF coating process.

Referring to FIGS. 3 and 4, an HVOF sprayed alumina based coating and a plasma sprayed alumina based coating can exhibit distinctive features in their respective particle interface microstructures, even when using the same feedstock. Exemplary alumina based compositions can include, for example, $Al_2O_3$, $MgAl_2O_4$ or $Al_2O_3$-(3-40 wt %) $TiO_2$. The HVOF sprayed coating of FIG. 3 reveals well-adhered splats with finer porosity, which results in a large number of particle interfaces as well as a dense structure that exhibits a high elastic modulus, due to the fine particle size of the powder feedstock used. The plasma sprayed coating of FIG. 4 reveals large globular pores, interlamellar pores and cracks, which result in a lower number of particle interfaces as well as a structure that is not as dense and that exhibits a lower elastic modulus. For example, the elastic modulus of the coating shown in FIG. 3 is 99 GPa and the elastic modulus of the coating shown in FIG. 4 is 71 GPa.

The use of HVOF can be preferred over plasma spraying techniques, because the HVOF technique can help achieve a high elastic modulus (i.e., density) in the ceramic coating without compromising the mechanism for dampening vibrations. The plasma spray technology utilizes the high temperature (enthalpy) availability within the thermal plasma to enable melting and deposition of the coating particles. The HVOF thermal spray technology is a variation, which uses combustion gases to generate a compressed flame. By axially injecting the feedstock powder, the particles are also subjected to a high acceleration to supersonic velocities. Upon impacting the substrate, such high velocity particles spread out thinly (i.e., splat) to form a well-bonded dense coating. Thus, very distinct microstructures can result from the two spray coating deposition processes.

Uniform particle flattening can occur when a fine particle size is used with the high impact velocity of the HVOF process. It has been observed that the individual particle thickness in the HVOF scenario upon impact is $\frac{1}{4}^{th}$ of the particle thickness in the plasma spray process. Thus, the use of an HVOF process can result in a higher number of splat or otherwise flat interfaces per unit thickness of the resulting coating (i.e., per unit length normal to the substrate). In addition, FIGS. 3 and 4 show distinctive features in the coated microstructure, with the HVOF coating of FIG. 3 showing well-adhered splat particles with a fine porosity, and the plasma sprayed coating of FIG. 4 displaying large globular pores, interlamellar pores and cracks. Thus, in order to obtain improved vibration damping ability in the coating, according to the present invention, it may be desirable for the coating to be a multilayered coating, with the layer closest to the target substrate (e.g., the engine component or portion) being formed using a plasma spraying process so as to exhibit a lower elastic modulus to provide improved vibration damping as well as, e.g., to accommodate residual stresses (e.g., the FIG. 4 layer) and the layer defining the outer surface of the coating being formed using a HVOF process so as to exhibit a higher elastic modulus, e.g., for erosion resistance (e.g., the FIG. 3 layer). The combination of the two layers can also result in a desirable effective thermal conductivity.

Thus, the present method can be practiced using a plurality of ceramic particle feedstocks, with each feedstock serving as a source of ceramic particle material for the spraying process. The spraying process can comprise a plurality of separate steps of spraying ceramic particles, with each step of spraying using a different one of the plurality of ceramic particle feedstocks as a source of ceramic particle material. In addition or alternatively, the spraying process of the present method can comprise a plurality of separate steps of spraying ceramic particles, with each step of spraying using a different one of a plurality of ceramic particle deposition techniques.

Further, the present method can be practiced using a plurality of ceramic particle feedstocks, with each feedstock serving as a source of ceramic particle material for said spraying, and using a plurality of separate steps of spraying ceramic particles. Each step of spraying can use (a) a different one of the plurality of ceramic particle feedstocks as a source of ceramic particle material, (b) a different one of a plurality of ceramic particle deposition techniques, or (c) a combination of (a) and (b).

What is claimed is:

1. A portion of an engine comprising:

a surface coated with a ceramic coating having a thickness and a surface area, said coating comprising a plurality of ceramic particles and corresponding particle interfaces, with at least some of said ceramic particles being partially bonded together, and said coating having a change in said particle interfaces through the thickness of said coating, across the surface area of said coating or both;

wherein said coating exhibits a corresponding change in the ability of said coating to impart at least one functional characteristic to said engine portion through the thickness of said coating, across the surface area of said coating or both;

wherein said coating comprises a multilayered ceramic coating having:

an inner layer formed at least partially from hollow particle feedstock comprising hollow particles; and an outer layer formed at least partially from solid particle feedstock comprising fused and crushed powders; and wherein said coating effects damping of vibrations through internal friction between said particle interfaces and the hollow particles result in splat interfaces causing an increase in interfaces.

2. The engine portion according to claim 1, wherein said portion is a component of a turbine engine, and said surface is partially coated with said ceramic coating.

3. The engine portion according to claim 1, wherein at least one of the number of said particle interfaces and the type of said particle interfaces change according to a gradient through the thickness of said coating, across the surface area of said coating or both.

4. The engine portion according to claim 3, wherein said particle interfaces change according to a gradient through the thickness of said coating.

5. The engine portion according to claim 1, wherein said particle interfaces include particle pore interfaces.

6. The engine portion according to claim 1, wherein said inner layer is closer to said engine surface and has relatively more porosity and particle interfaces than said outer layer.

7. The engine portion according to claim 1, wherein said coating exhibits a corresponding change in one or more of the following functional characteristics through the thickness of the coating, across the surface area of the coating or both: (a) thermo-physical properties, (b) mechanical properties, (c) abradability, (d) vibration damping, (e) crack arresting, and (f) stress relaxation.

8. The engine portion according to claim 1, wherein said coating exhibits a corresponding change in the ability of said coating to dampen vibration through the thickness of said coating, across the surface area of said coating or both.

9. The engine portion according to claim 1, wherein said inner layer comprises an elastic modulus of about 29 Giga Pascals (GPa) and said outer layer comprises an elastic modulus of about 57 GPa.

10. The engine portion according to claim 1, wherein said inner layer comprises an elastic modulus of about 71 GPa and said outer layer comprises an elastic modulus of about 99 GPa.

11. The engine portion according to claim 1, wherein:

said inner layer is applied using a plasma spray process; and said outer layer is applied using a high velocity oxygen fuel thermal spray process.

12. The engine portion according to claim 1, wherein said coating comprises a hybrid multilayered ceramic coating, wherein:

said inner layer is formed from both hollow particle feedstock comprising plasma densified powders and solid particle feedstock comprising fused and crushed powders; and said outer layer is formed from both hollow particle feedstock comprising plasma densified powders and solid particle feedstock comprising fused and crushed powders.

13. The engine portion according to claim 1, wherein the hollow particles result in splat interfaces comprising splat particles that are plate-like in shape.

14. The engine portion according to claim 1, wherein the hollow particles result in splat interfaces comprising splat particles that are thinner than they are wide.

* * * * *